United States Patent
Pilossof

(10) Patent No.: US 6,618,187 B2
(45) Date of Patent: Sep. 9, 2003

(54) BLAZED MICRO-MECHANICAL LIGHT MODULATOR AND ARRAY THEREOF

(75) Inventor: Nissim Pilossof, Rehovot (IL)

(73) Assignee: Creo IL. Ltd., Herzlia (IL)

( * ) Notice: Subject to any disclaimer, the term of this patent is extended or adjusted under 35 U.S.C. 154(b) by 0 days.

(21) Appl. No.: 09/901,728

(22) Filed: Jul. 11, 2001

(65) Prior Publication Data

US 2002/0021485 A1 Feb. 21, 2002

Related U.S. Application Data

(60) Provisional application No. 60/218,063, filed on Jul. 13, 2000.

(51) Int. Cl.[7] .............................................. G02B 26/00
(52) U.S. Cl. ........................ 359/295; 359/291; 359/298; 359/224; 359/573
(58) Field of Search ................................ 359/290–292, 359/298, 223, 224, 279, 573, 295

(56) References Cited

U.S. PATENT DOCUMENTS

| | | | |
|---|---|---|---|
| 5,311,360 A | 5/1994 | Bloom et al. | 359/572 |
| 5,459,610 A | 10/1995 | Bloom et al. | 359/572 |
| 5,629,801 A | 5/1997 | Staker et al. | 359/572 |
| 5,661,592 A | 8/1997 | Bornstein et al. | 359/291 |
| 5,677,783 A | 10/1997 | Bloom et al. | 359/224 |
| 5,808,797 A | 9/1998 | Bloom et al. | 359/572 |
| 5,841,579 A | 11/1998 | Bloom et al. | 359/572 |
| 5,920,518 A | 7/1999 | Harrison et al. | 365/233 |
| 5,949,570 A | 9/1999 | Shiono et al. | 359/291 |
| 5,982,553 A | 11/1999 | Bloom et al. | 359/627 |
| 5,999,319 A * | 12/1999 | Castracane | 359/572 |
| 6,014,257 A | 1/2000 | Furlani et al. | 359/573 |
| 6,031,652 A | 2/2000 | Furlani et al. | 359/224 |
| 6,172,796 B1 * | 1/2001 | Kowarz et al. | 359/224 |
| 6,477,955 B1 | 11/2002 | Landsman | 101/457 |

OTHER PUBLICATIONS

B. Courtois et al., "Design, Test and Microfabrication of MEMS and MOEMS", SPIE proceedings 3680, 1999, ISBN 0–8194–3154–0, (cover page and table of contents).

M. Born and E. Wolf, "Principles of Optics", Pergamon, New York, 1975, pp. 401–405.

* cited by examiner

Primary Examiner—Evelyn Lester
(74) Attorney, Agent, or Firm—Eitan, Pearl, Latzer & Cohen Zedek, LLP.

(57) ABSTRACT

A light valve of deformable grating type and a method for light modulation using the light valves is provided. The light valve of deformable grating type, includes at least three beams, one beam of the at least three beams being of a substantially fixed-position, and at least two beams of the at least three beams being deformable by electrostatic force in a substantially staircase structure, each step of the staircase creating a predefined change in the phase of an impinging light beam, a first electrode and a second electrode, the electrodes transmitting electrostatic force to at least the deformable beams of the at least three beams. The beam of a substantially fixed-position may be deformable by electrostatic force.

30 Claims, 8 Drawing Sheets

BLAZED MICRO-MECHANICAL LIGHT MODULATOR AND ARRAY THEREOF

CROSS REFERENCE TO RELATED APPLICATIONS

This application claims the benefit of U.S. provisional application Ser. No. 60/218,063 filed Jul. 13, 2000.

FIELD OF THE INVENTION

The present invention relates to micro-mechanical light modulators and to Spatial Light Modilators (SLMs) including arrays of such modulators.

BACKGROUND OF THE INVENTION

Various optical applications, such as projection, imaging and optical fiber communication, require light modulation and/or light beam steeped In optical applications where a plurality of optical beams should be handled simultaneously, the modulation can be achieved by using optical modulators called Spatial Light Modulators (SLMs) or Light Valves (LVs), which are arrays of individually controlled members. Distinctive class SLMs work in diffractive mode; An activated individual member of the SLM array diffracts the incoming light beam at a discrete multitude of angles, these angels being a function of the light wavelength and the dimensions of the modulator. Such modulators, based on Micro Elctro-Mechanical Systems (MEMS) technology and called Deformable Diffractive Gratings, are described, for example, in U.S. Pat. Nos. 5,311,360; 5,459,610 to The Board of Trustees of the Leland Stanford, Junior University; U.S. Pat. Nos. 5,629,801; 5,661,592 to Silicon Light Machines; U.S. Pat. No. 5,677,783 to The Board of Trams of the Leland Stanford, Junior University; U.S. Pat. Nos. 5,808,797; 5,841,579; 5,982,553 to Silicon Light Machines; U.S. Pat. No. 5,920,518 to Micron Technology, Inc.; U.S. Pat. No. 5,949,570 to Matsushita Electric Industrial Co.; U.S. Pat. No. 5,999,319 to InterScience Inc.; U.S. Pat. Nos. 6,014,257; 6,031,652 to Eastman Kodak Company.

In the conventional art Deformable Diffractive Gratings light modulation systems, the diffractive element is usually of "piston" type or cantilever mirror type. Both types of diffractive elements have some advantages, while suffering from some drawbacks. For example, a piston diffractive grating element is always faster than a cantilever mirror diffractive grating element, however, its efficiency is lower. Reference is made now to FIGS. 1, 2a, 2b and 2c, which show a typical conventional art design of a piston diffractive type element and demonstrate its operation. Throughout the figures, similar elements are noted with similar numeral references.

FIG. 1 is a schematic isometric view of a conventional art piston type deformable grating element 10. The element 10 consists of several beams, noted 25, created by a photolithographic process in a frame 20. The beams 25 define a diffractive grating 22, supported by the etched structure 30. The bee 25 rest on a silicon substrate base 40. Beams 21 of the beams 25 are movable and are suspended over gaps 41, which are etched in the silicon substrate base 40, while other beams 23 of the beams 25 are static. The beams 25 are coated with a reflective layer 60. This reflective layer 60 is conductive and functions as an electrode. An opposite electrode 50 is deposited on the opposite side of the silicon substrate 40.

FIGS. 2a and 2b show the A—A cross-section of the conventional art modulator 10 of FIG. 1 in non-active and active states, respectively. In FIG. 2a, no voltage is applied between the suspended beams 21 and the common electrode 50. Accordingly, all the beams 21 and 23 are coplanar and the diffractive element works as a plane mirror, i.e. incident beam 70 and reflected beam 71 are in the exact opposite directions. When voltage is applied between the suspended beams 21 and the common electrode 50, as shown in FIG. 2b, the suspended beams 21 are deformed in the direction of the electrical field created by the applied voltage. Thus, the non-suspended beams 23 and the suspended beams 21 define a diffractive structure returing an incident beam 70 in directions 171. The directions 171 and the direction 70 of the incident beam constitute an angle $\Phi$ which follows the laws of diffractive optics and is called a diffractive angle. The angle $\Phi$ is a function of the light wavelength $\lambda$ and the grating period d. The diffraction efficiency is a function of the grating amplitude. For piston type grating, the optimal amplitude for achieving optimal efficiency, is $\lambda/4$, as illustrated in FIG. 2b. In this example and the example below it is assumed that the light modulation system operates in air with refractive index n=1.

FIG. 2c shows the angular distribution of the light energy for non-active (thin line) and active (thick line) $\lambda/4$ optimize piston type deformable grating light modulating element. The calculations are made for Fraunhofer diffraction of parallel light beam while $\lambda$=830 nm and grating period d=10 $\mu$m, and while King into account the interference of two simultaneously working elements (i.e. 2d 'UP'-'DOWN'-'UP'-'DOWN' structure). It can be seen from this figure that when the element is active, most of the energy is distributed in the $+1^{st}$ and $-1^{st}$ orders, while when it is non-active, most of the energy is distributed in the "zero" order (tinner line).

Commonly, there are two kinds of distinctive optical systems that utilize diffractive type light modulators: optical light systems having spatial filtering of the "zero" order, and optical light systems having spatial filtering of the $\pm1^{st}$ and higher orders. When the "zero" order is filtered, the maximal theoretical energy efficiency is 70%, while when the $\pm1^{st}$ and higher orders are filtered, the maximal theoretical energy efficiency can be as high as 90%. In both cases, the maximal theoretical contrast ratio (the ratio between the energies passing the spatial filter in the active and non-active states, respectively) that can be achieved is 1:12.

However, for most applications, such as pre-press imaging and projection displays, contrast ratio as low as 1:12 is unacceptable. An additional disadvantage of the piston type diffractive grating modulators, is that when in active state, the light energy is distributed symmetrically in the $\pm1^{st}$ and higher orders, which in many cases can lead to a more complex optical system, as the light has to be cutoff from both sides of the maximum.

SUMMARY OF THE INVENTION

There is provided in accordance with an embodiment of the invention, a light valve of deformable grating type. The light valve includes at least three beams, one beam of being of a substantially fixed-position, and at least two beams being deformable by electrostatic force in a substantially staircase structure, each step of the staircase creating a predefined change in the phase of an impinging light beam, and first and second electrodes for transmitting electrostatic force to at least the deformable beams.

There is also provided in accordance with a further embodiment of the invention, a light valve of deformable grating type, which includes at least three beams, one beam being of a substantially fixed-position, and the three beams being deformable by electrostatic force in a substantially staircase structure, each step of the staircase creating a predefined change in the phase of an impinging light beam and a first electrode and a second electrode, the electrodes transmitting electrostatic force to the deformable beams.

In addition, there is also provided in accordance with an embodiment of the invention, a method for light modulation. The method includes the steps of:

providing a light valve of deformable grating type, the light valve includes at least three beams, at least the first beam of the at least three beams being of a substantially fixed-position, and at least two beams of the at least three beams being deformable by electrostatic force in a substantially staircase structure, each step of the staircase creating a predefined change in the phase of an impinging light beam;

illuminating the light valve,; and applying voltage between the first electrode and the second electrode.

providing a light valve of deformable grating type, the light valve includes at least three beams, at least the first beam of the at least three beams being of a substantially fixed-position, and the at least three beams being deformable by electrostatic force in a substantially staircase structure, each step of the staircase creating a predefined change in the phase of an impinging light beam;

illuminating the light valve; and applying voltage between the first electrode and the second electrode.

Furthermore, in accordance with an embodiment of the invention, the deformable beams form the first electrode and the second electrode is common to all the deformable beams.

Furthermore, in accordance with an embodiment of the invention, the deformable beams form the first electrode and the second electrode includes an array of electrodes, each electrode of the array of electrodes associated with one of the deformable beams.

Furthermore, in accordance with an embodiment of the invention, the first electrode includes an array of electrodes, each electrode of the array of electrodes associated with one of the deformable beams, and the second electrode is common to all the deformable beams.

In addition, in accordance with an embodiment of the invention, a spatial light modulator is formed as an array of light valves.

Furthermore, in accordance with an embodiment of the invention, the beam of a substantially fixed-position is deformable by electrostatic force.

Furthermore, in accordance with an embodiment of the invention, the at least three beams form the first electrode and the second electrode is common to all the deformable beams. Alternatively, the at least three beams form the first electrode and the second electrode includes an array of electrodes, each electrode of the array of electrodes associated with one of the at least three beams.

Furthermore, in accordance with an embodiment of the invention, the first electrode includes an array of electrodes, each electrode of the array of electrodes associated with one of the at least three beams, and the second electrode is common to all the at least three beams.

DETAILED DESCRIPTION OF THE INVENTION

Detailed description of the technologies employed in producing IS devices can be found in conventional art publications, such as "Design, Test, and Microfabrication of MEMS and MOEMS", B Courtois et al, SPIE proceedings 3680, 1999, ISBN 0-8194-3154-0.

Figure 3A:
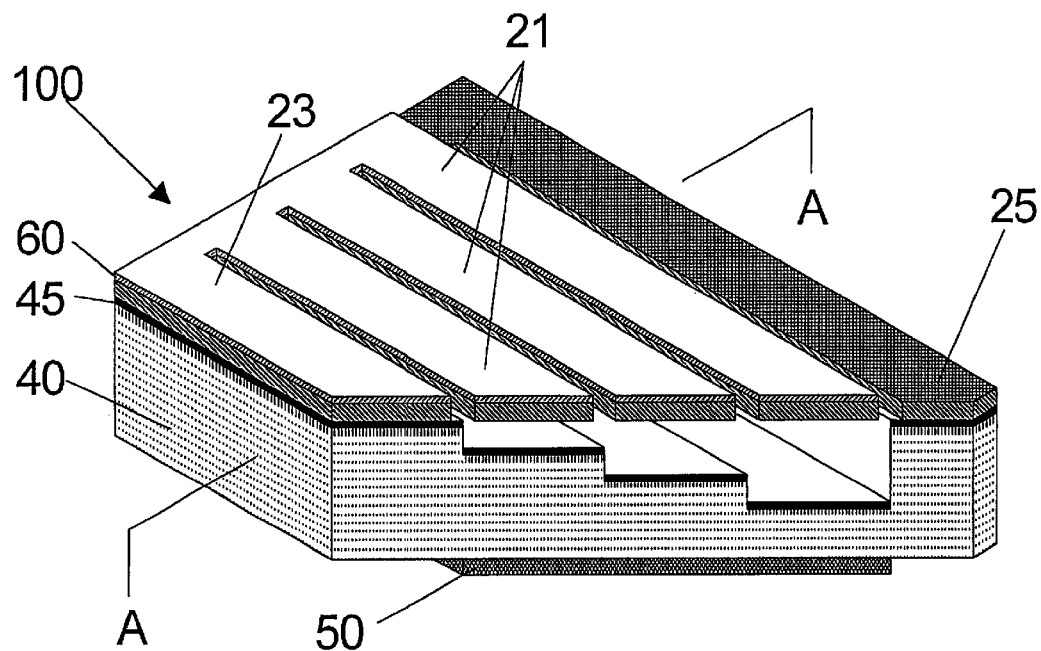
FIGS. 3a and 3b are schematic isometric views of diffractive modulators of blazed deformable grating type according to the present invention.
Figure 3B:
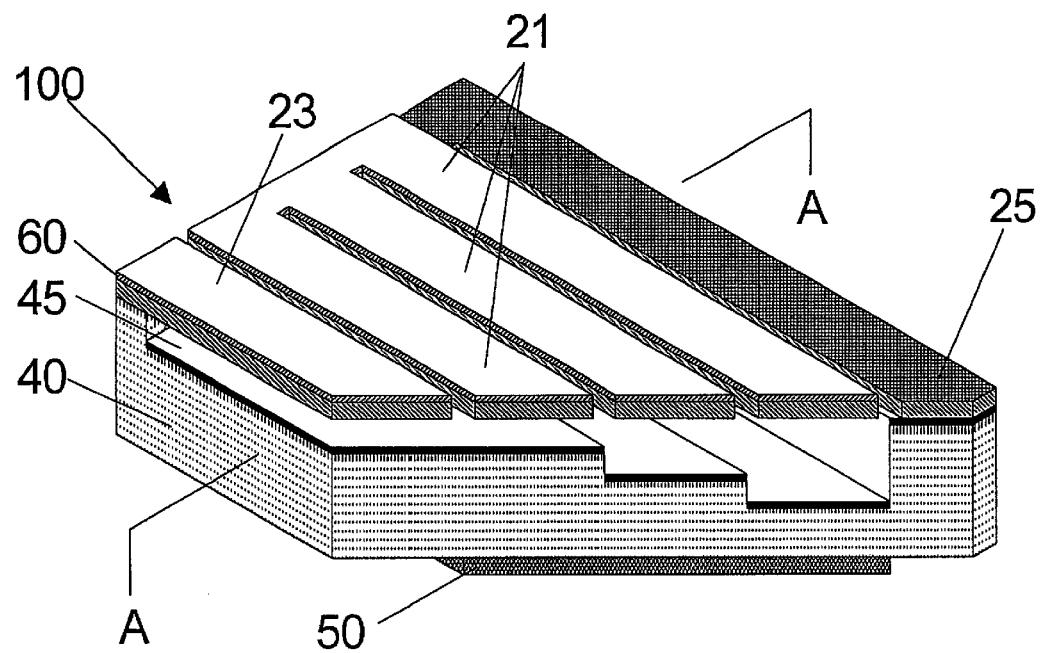

Reference is made now to FIGS. 3a and 3b, showing a deformable grating type diffractive modulator 100, according to the present invention Modulator 100 consists of a plurality of beams 21 and 23, the beams 21 being suspended over a silicon structure base 40 coated with insulation layer 45. The beams 21 can be made, for example, from low stress silicon nitride and are etched in a frame 25 by sacrificial layer method. The beams 21 that, as will be explained below, form a diffractive grating, are the active part of the modulator and are coated with a highly reflective layer 60. Layer 60 may be chosen of a material such that high reflectivity will be achieved, in accordance wit the wavelet of the light to be modulated and can be, for example, of aluminum, silver, gold or wavelength optimized metal—dielectric mirror. In addition, the layer 60 acts as the first electrode for applying a voltage between the beams 21 and the second electrode 50.

Figure 4C:
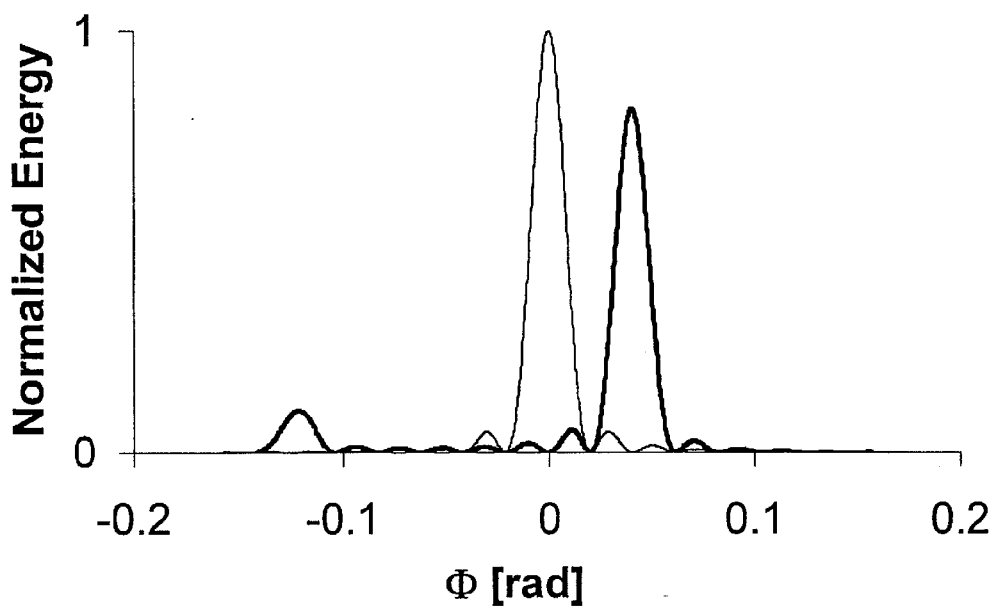
FIGS. 4a, 4b and 4c illustrate the performance of diffractive modulators of blazed deformable grading type according to the present invention.
Figure 4A:
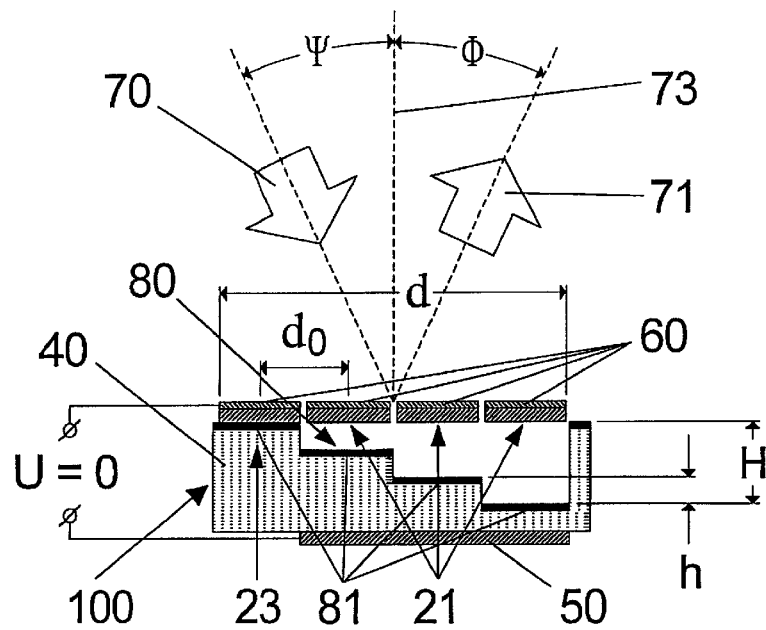
Figure 4B:
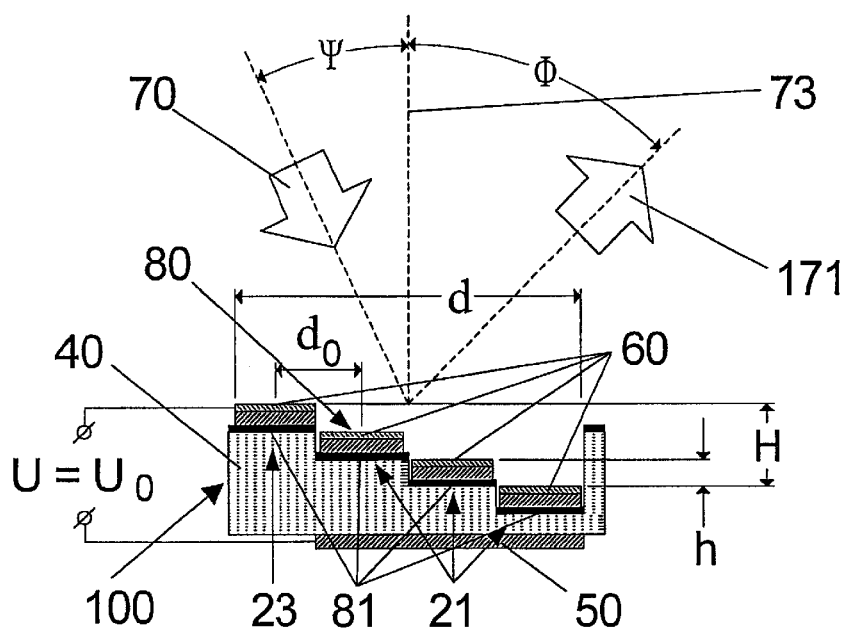

Reference is made now to FIGS. 4a and 4b, which illustrate the A—A cross-section of the diffractive modulator 100 of FIG. 3a As illustrated in FIG. 4a, base 40 of the modulator is shaped in a star case structure 80, so that the beams 21 are suspended at different distances from the base 40. Faker, the beam 23 is fixed and rests on the base 40. Preferably, for this embodiment, the number of the steps 81 of the staircase structure 80 is n (n being the total number of beams 21 and 23 in the modulator 100) and each step of the steps 81 of the staircase structure 80 is of the same height h, such that h=H/3, where H is the amplitude of the grating. The way of determining the parameters of the staircase structure 80, i.e. the pitch $d_0$ of the beams 21 and 23 and the amplitude H will be addressed below.

FIG. 4a shows the modulator 100 of FIG. 3a in a non-active state—the voltage applied between the first electrodes 60 and the second common electrode 50 is U=0.Preferably in this state, all the suspended beams 21 are in their uppermost position and are preferably coplanar with the fixed beam 23. In this state, the modulator will act as a plane mirror, thus an optical beam 70 impinging the modulator at an angle $\Psi$ with respect to the normal 73, will be reflected back at an angle $\Phi=\Psi$.

FIG. 4b shows the modulator 100 of FIG. 3a, with voltage $U=U_0$ applied between the first electrodes 60 and the second electrode 50. Due to the electrostatic forces, all the suspended beams 21 are deformed and each one preferably rests on its corresponding step 81 of the staircase structure 80. The resulting periodic structure performs as a diffractive grating with a grating constant $d=n*d_0$ and a grating amplitude H (n being the total number of beams 21 and 23 and the number of the steps 81 in the staircase structure 80. In this example n⊖4). An optical beam 70 impinging the surface of modulator 100 at an angle Ψ with respect to the normal 73, will be diffracted in multitude directions 171, with specific angular distribution of the energy (for clarity reasons, only one direction of the directions 171 is shown in the figure).

For achieving maximum contrast ratio in the light modulation system, it is required that in its active state, the energy returned in the direction Φ=Ψ is zero (or minimal), i.e. E(-Ψ)=0. According to the diffraction theory, this condition can be fulfilled when $$\sum_{p=0}^{n-1} \exp\left(\frac{2\pi i}{\lambda} p\Delta\right) = 0,$$

where λ is the wavelength and $$\Delta = \frac{H}{n-1}(\cos\Phi + \cos\Psi) + d_0(\sin(\Phi) + \sin(\Psi))$$

is the phase shift achieved, for example, in a "plane wave" optical beam 70 by each step 81.

Figure 1:
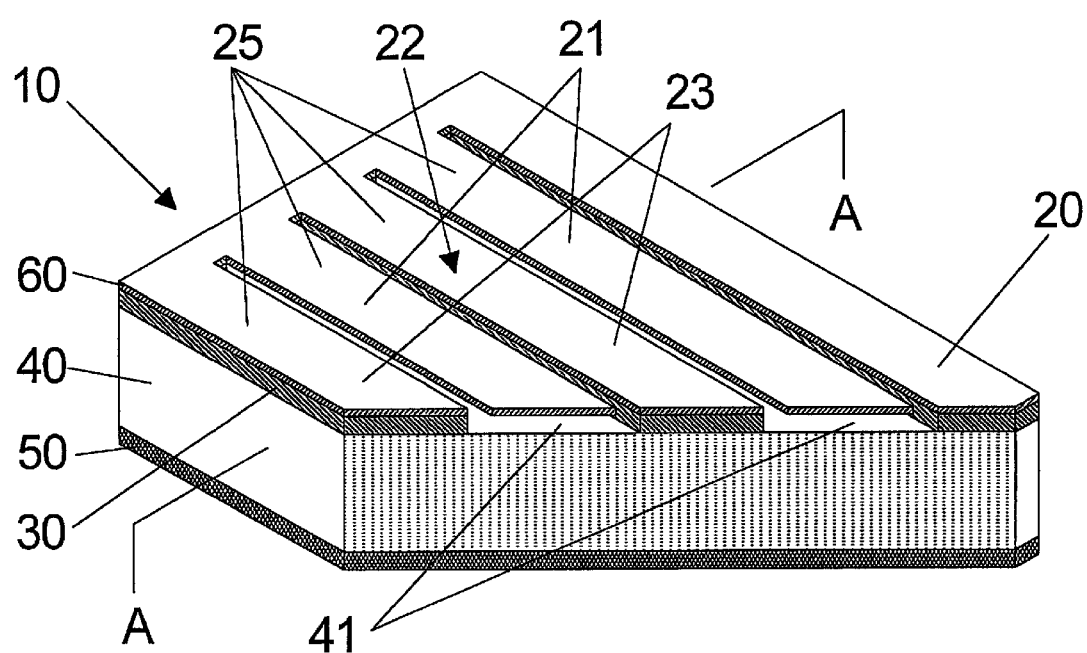
FIG. 1 is an isometric view of a conventional art diffractive modulator of piston deformable grating type.
Figure 2A:
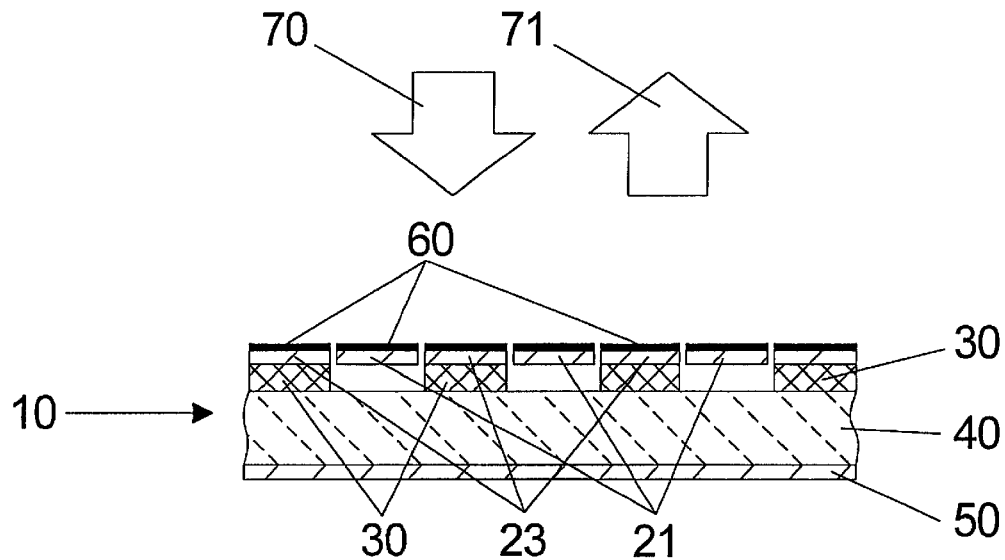
FIGS. 2a, 2b and 2c illustrate the performance of the conventional art diffractive modulator of FIG. 1.
Figure 2B:
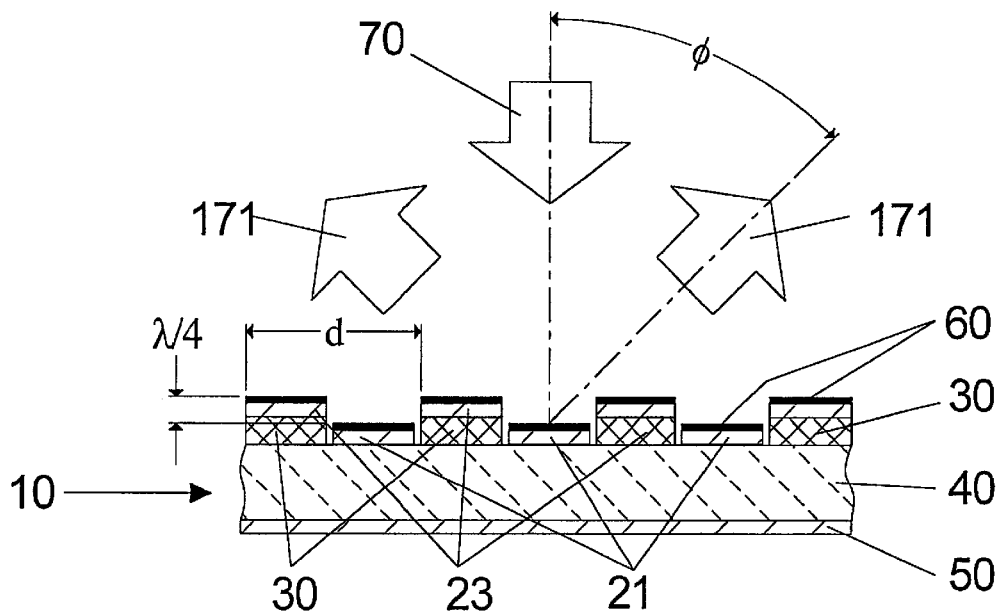
Figure 2C:
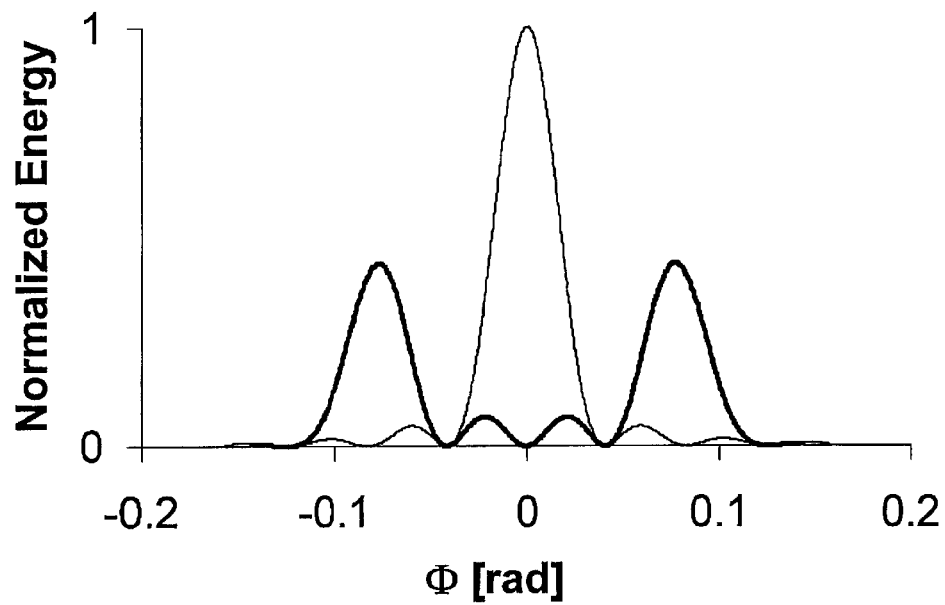

These equations may be used for optimizing blazing) the diffractive f or a given wavelength. An example of such optimizing is shown in FIG. 4c, where the calculations are made for λ=830nm, $d_0$=5 μm, andΨ=0, and while assuming interference of two diffractive modulators 100 of the present invention. In the figure, the dotted line represents the energy angular distribution created by a non-active modulator (U=0)—simple reflection, while the solid line represents the energy angular distribution in an active state of the modulator ( U=$U_0$)—diffraction. It can be seen that the predominant part of the energy is concentrated in a narrow range of angles forming one sharp maximum, which is the essence of the blazed gratings. It can also be seen that the energy efficiency (EE) and the contrast ratio (CR) are significantly better compared to a conventional art piston grading modulator (FIG. 2c). In an optical system utilizing a light modulator according to the present invention, when filtering the "zero" order EE=75% and CR=20:1. When an optical system utilizing a light modulator according to the present invention filters the $1^{st}$ order then EE=91% and CR=25:1. These numbers clearly demonstrate an advantage of the blazed modulators of the present invention.

The optimization procedure described above is valid for blazed modulator with equal center-to-center distance $d_0$ between the beams 21, equal widths of beams and equal depth of steps h. It is however appreciated, that other designs with unequal center-to-center distances and/or unequal widths of beams and/or unequal depths of steps are also possible, and are also considered in the scope of the present invention In such cases, the optimization condition is more complicated and usually has only numerical solutions. Such optimization calculations are discussed for example, in M. Born and E. Wolf, *Principles of Optics*, Pergamon, N.Y., 1975.

An additional embodiment of the present invention is shown in FIG. 3b. It differs from the arrangement shown in FIG. 3a in the design of the base 40 and the electrode 23. In this embodiment, the beam 23 is also suspended rather than rested on the base 40. Beam 23 however, does not have electrical connection with the rest of the beams 21 and therefore its position is not affected by applying an electrical field to these beams. This design has the same performance as the design of FIG. 3a and can be optimized using the same procedure explained above with regard to FIGS. 4a and 4b, The advantage of such a design is that its process of production is more convenient, especially when a plurality of such modulators are arranged in an array.

Figure 5A:
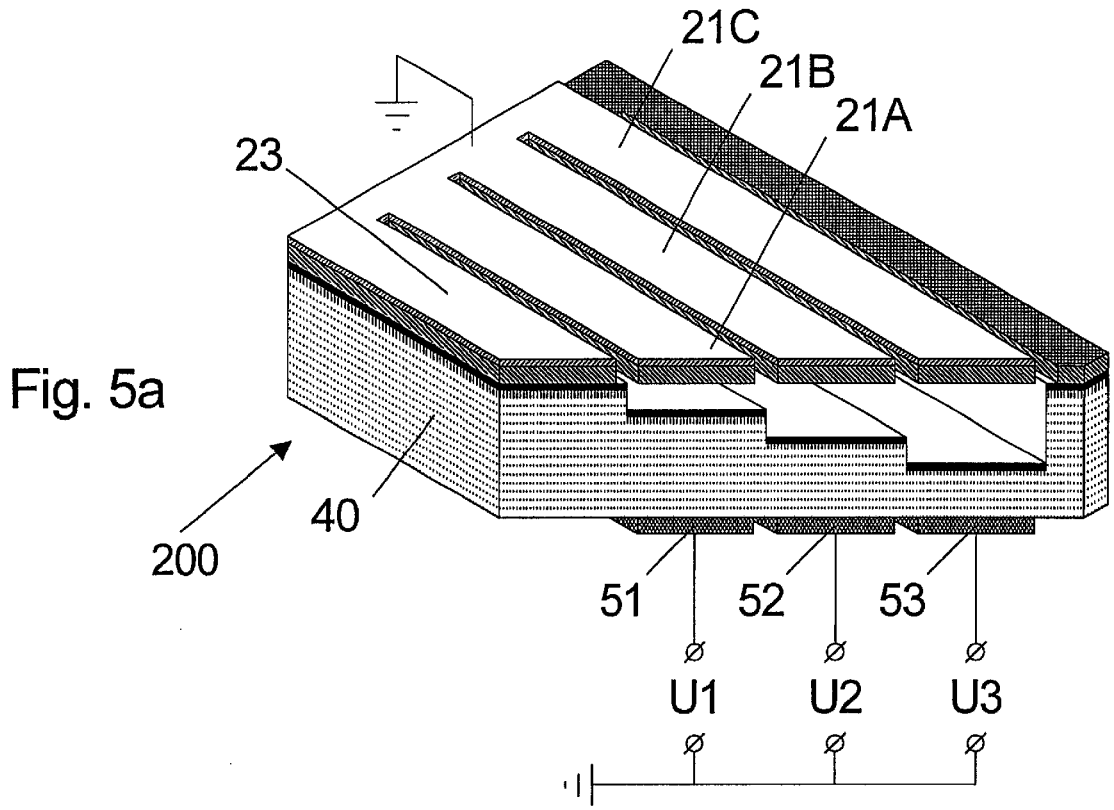
FIGS. 5a–5d are schematic views of additional diffractive modulators of blazed deformable grating type according to the present invention.
Figure 5B:
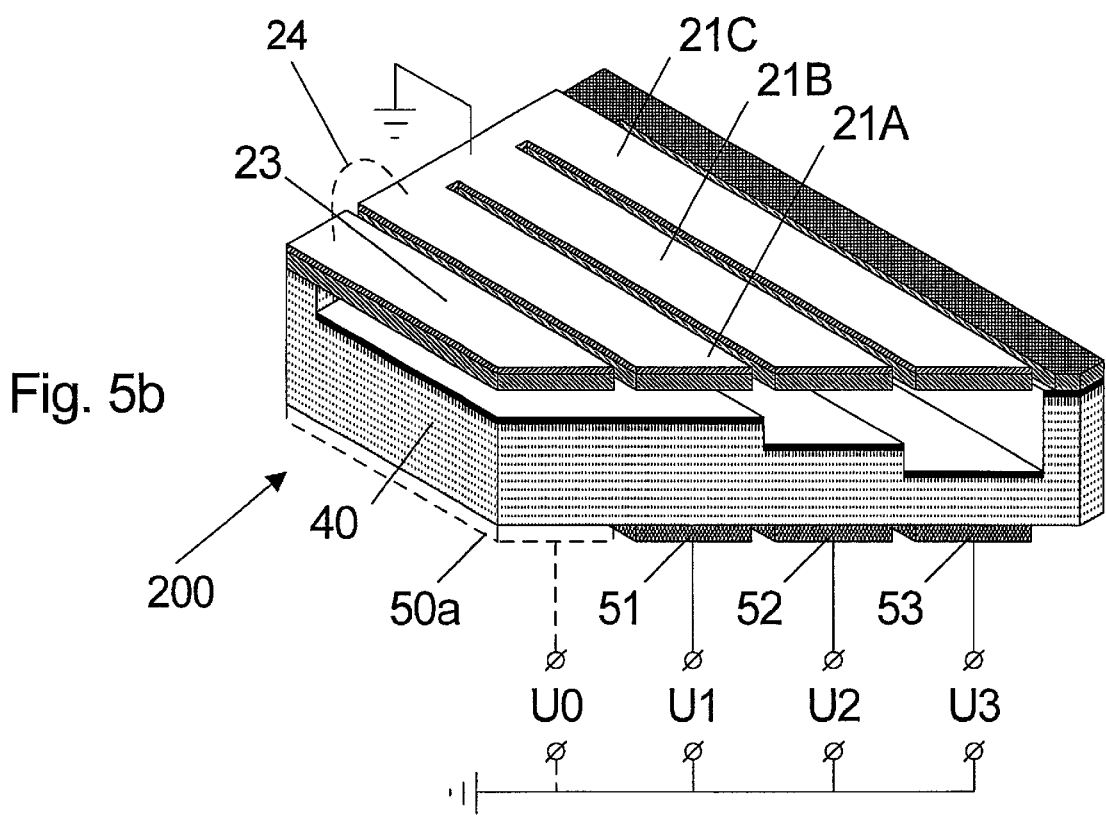

Reference is made now to FIGS. 5a and 5b, presenting an additional embodiment of the present invention. The diffractive light modulator 200 of the present invention has the same basic structure as the embodiments of FIGS. 3a and 3b, respectively, but for the common electrode 50 (FIGS. 3a and 3b), which is replaced by an array of electrodes 51, 52 and 53, each associated wit a corresponding suspended beam 21A, 21B and 21C, respectively. Accordingly, while the suspended beams still present one first electrode, the second electrode is now an array of electrodes. This configuration allows for fine tuning of the non-diffractive state, by applying small different bias voltages U1, U2 and U3 to each suspended beam 21A, 21B and 21C respectively, thus arranging them to be essentially coplanar with the beam 23. Optionally, a counter electrode 50a can be added to beam 23 of the embodiment of FIG. 5b (shown with dashed line) for receiving voltage U0 for fine-tuning. In this case, the beam 23 should be short-circuited to the suspended beams 21A, 21B and 21C as schematically shown by the dashed curve 24.

Figure 5C:
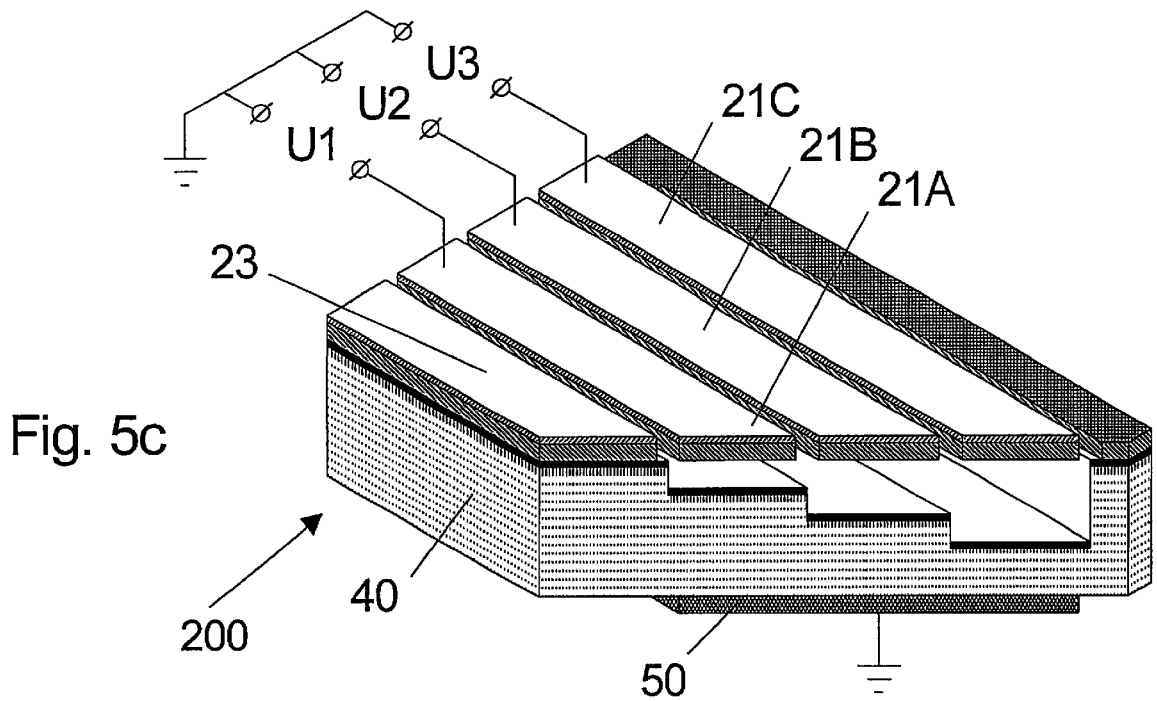
Figure 5D:
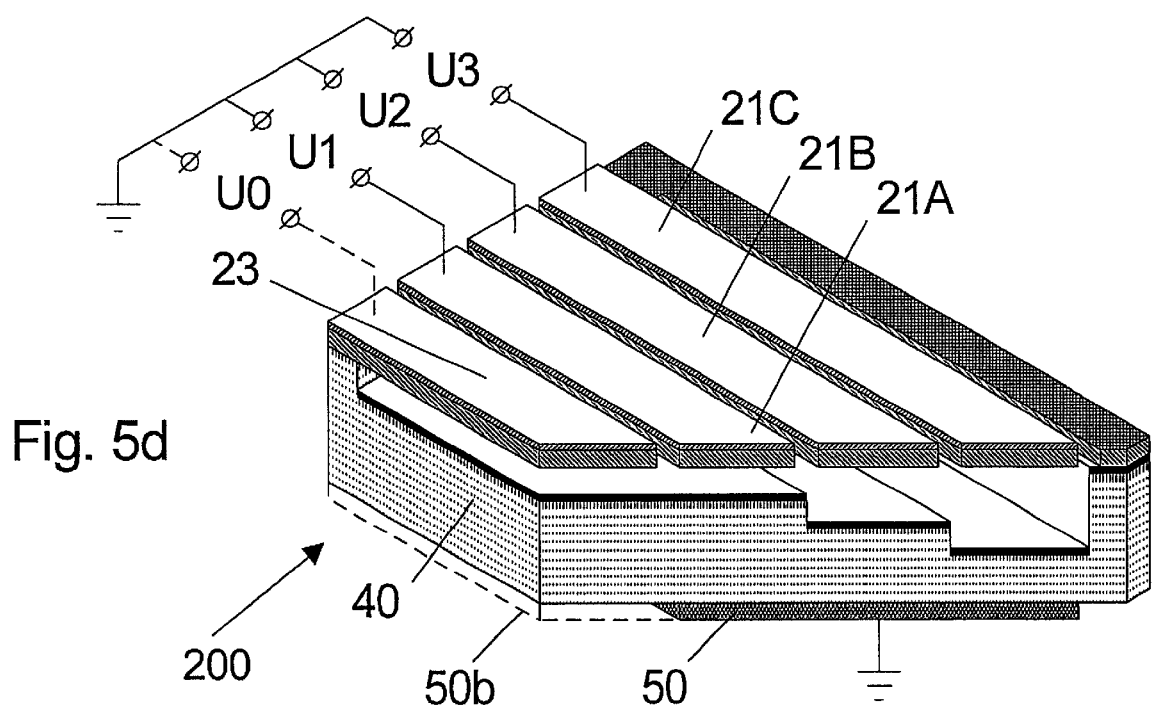

It is appreciated that the same effect can be achieved by applying different small bias voltages to each of the suspended beams 21A, 21B and 21C, relative to a common second electrode, as illustrated schematically in FIGS. 5c and 5d. Optionally, beam 23 of the design of FIG. 5d, can also be supplied with electrical connection (shown with dashed line) for receiving voltage U0 for fine-tuning. In this case, the common counter electrode 50 should be extended, as shown by the dashed line 50b.

Although the exemplary light modulators discussed above consist of four beams—one fixed and three suspended, it is appreciated that other configurations, with different number of suspended beams, are also possible. Furthermore, a higher number of suspended beams enables tuning (blazing) the grating modulator to higher diffractive orders, while maintaining similarly high EE and CR.

Figure 6:
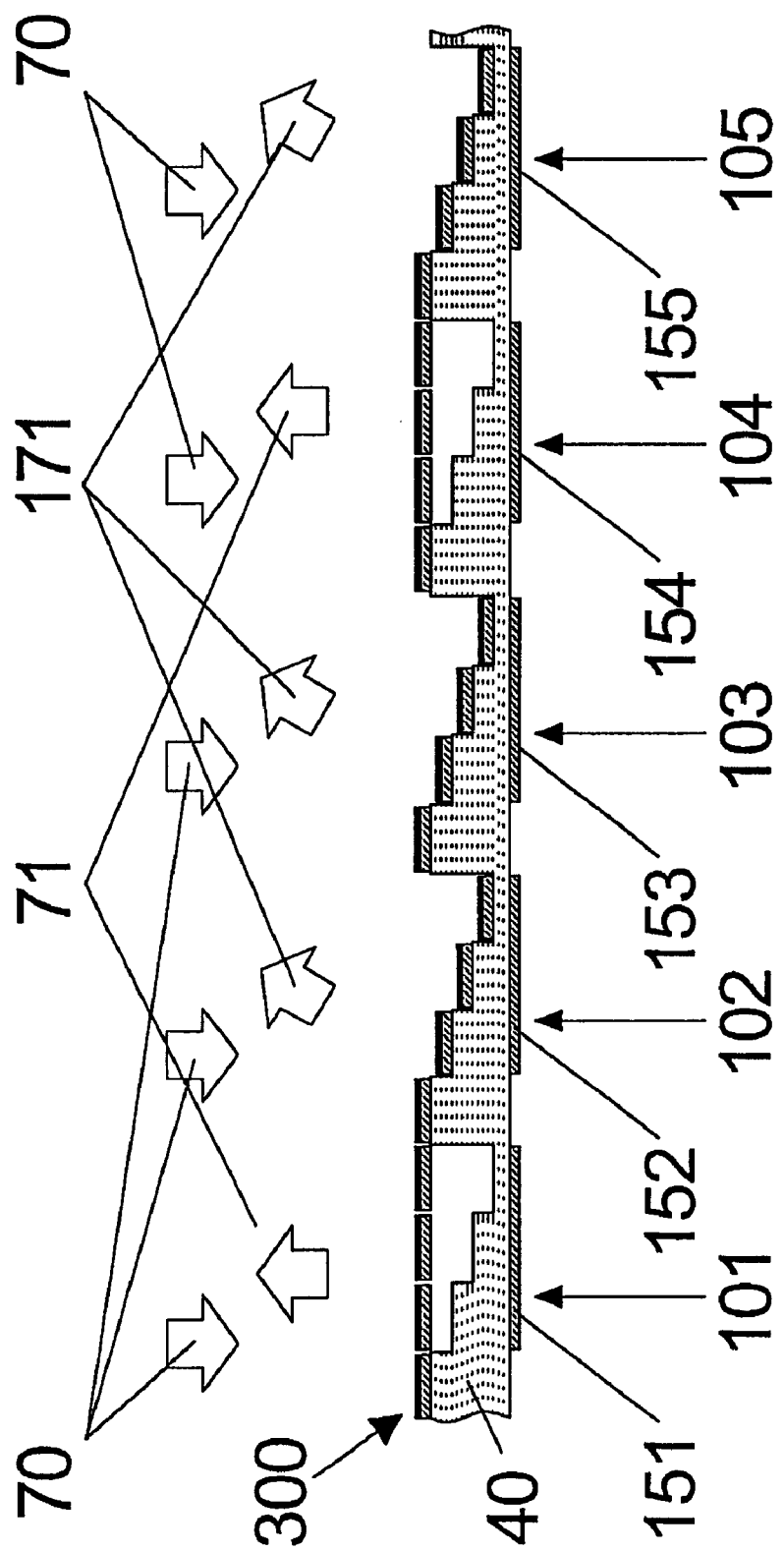
FIG. 6 is a schematic view of a diffractive SLM utilizing diffractive modulators of blazed deformable grating type according to the present invention.

Reference is made now to FIG. 6, which is a schematic illustration of an array of blazed modulators of deformable grating type 300 according to the present invention. The modulators are placed on one common silicon wafer base 40, by employing standard, well known in the art technology. The figure illustrates part of the array 300, consisting of five individual modulators 101 through 105. Modulators 101 and 104 are in a non-active state, thus working as plane mirrors. Modulators 102, 103 and 105 are active and diffract the incoming beam, as indicated by arrows 171. All the suspended beams can be short-circuited to form one common first electrode, while a dedicated second electrode 151 to 155 is assigned to each individual modulator 101 to 105, respectively. It is appreciated that a configuration in which the suspended beams of each individual modulator form several first electrodes, while the second electrode is common for all modulators is also possible. It is also appreciated that although the array 300 of FIG. 6 is constructed out of individual modulators of FIG. 3a, a design involving individual modulators of FIG. 3b and FIGS. 5a through 5d, or any combination thereof is possible as well.

What is claimed is:

1. A deformable grating light valve, comprising:
   at least three beams, one beam of said at least three beams being of a substantially fixed-position, and at least two beams of said at least three beams being deformable by electrostatic force in a substantially staircase structure, each step of said staircase creating a predefined change in the phase of an impinging light beam;

a first electrode and a second electrode, said first and second electrodes transmitting electrostatic force to at least two of said deformable beams of said at least three beams; and wherein said deformable beams form said first electrode and said second electrode comprises an array of electrodes, each electrode of said array of electrodes associated with one of said deformable beams.

2. A Spatial light modulator comprising an array of light valves of claim 1.

3. A deformable grating light valve, comprising:

at least three beams, one beam of said at least three beams being of a substantially fixed-position, and at least two beams of said at least three beams being deformable by electrostatic force in a substantially staircase structure, each step of said staircase creating a predefined change in the phase of an impinging light beam;

a first electrode and a second electrode, said first and second electrodes transmitting electrostatic force to at least two of said deformable beams of said at least three beams; and wherein said beam of a substantially fixed-position is deformable by electrostatic force.

4. The light valve of claim 3, wherein said at least three beams form said first electrode and said second electrode is common to all said deformable beams.

5. A Spatial light modulator formed as an array of light valves of claim 4.

6. The light valve of claim 3, wherein said at least three beams form said first electrode and said second electrode comprises an array of electrodes, each electrode of said array of electrodes associated with one of said at least three beams.

7. A Spatial light modulator formed as an array of light valves of claim 6.

8. The light valve of claim 3, wherein said first electrode comprises an array of electrodes, each electrode of said array of electrodes associated with one of said at least three beams, and said second electrode is common to all said at least three beams.

9. A Spatial light modulator formed as an array of light valves of claim 8.

10. A Spatial light modulator formed as an array of light valves of claim 3.

11. A deformable grating light valve, comprising:

at least three beams, one beam of said at least three beams being of a substantially fixed-position, and said at least three beams being deformable by electrostatic force in a substantially staircase structure, each step of said staircase creating a predefined change in the phase of an impinging light beam;

a first electrode and a second electrode, said first and second electrodes transmitting electrostatic force to at least two of said deformable beams of said at least three beams; and wherein said at least three beams form said first electrode and said second electrode is common to all said deformable beams.

12. The light valve of claim 11, wherein said at least three beams form said first electrode and said second electrode comprises an array of electrodes, each electrode of said array of electrodes associated with one of said at least three beams.

13. A Spatial light modulator formed as an array of light valves of claim 12.

14. The light valve of claim 11, wherein said first electrode comprises an array of electrodes, each electrode of said array of electrodes associated with one of said at least three beams, and said second electrode is common to all said at least three beams.

15. A Spatial light modulator formed as an array of light valves of claim 14.

16. A Spatial light modulator formed as an array of light valves of claim 11.

17. A method for light modulation, comprising the steps of:

providing a deformable grating light valve, said light valve comprising at least three beams, at least the first beam of said at least three beams being of a substantially fixed-position, and at least two beams of said at least three beams being deformable by electrostatic force in a substantially staircase structure, each step of said staircase creating a predefined change in the phase of an impinging light beam;

wherein said deformable grating light valve additionally comprises a first electrode and a second electrode, said first and second electrodes transmitting electrostatic force to at least two of said deformable beams of said at least three beams;

illuminating said light valve;

applying voltage between said first electrode and said second electrode; and wherein said deformable beams form said first electrode, and said second electrode comprises an array of electrodes, each electrode of said array of electrodes associated with one of said deformable beams.

18. A method according to claim 17, wherein said beam of a substantially fixed-position is deformable by electrostatic force.

19. A method according to claim 18, wherein all said at least three beams form said first electrode and wherein said second electrode is common to all said at least three beams.

20. A method according to claim 18, wherein said at least three beams form said first electrode and said second electrode comprises an array of electrodes, each electrode of said array of electrodes associated with one of said at least three beam.

21. A method according to claim 18, wherein said first electrode comprises an array of electrodes, each electrode of said array of electrodes associated with one of said at least three beams, and said second electrode is common to all said at least three beams.

22. A method for light modulation, comprising the steps of: providing a deformable grating light valve, said light valve comprising at least three beams, at least the first beam of said at least three beams being of substantially fixed-position, and at least two beams of said at least three beams being deformable by electrostatic force in a substantially staircase structure, each step of said staircase creating a predefined change in the phase of an impinging light beam, wherein said deformable grating light valve additionally comprises a first electrode and a second electrode, said first and second electrodes transmitting electrostatic force to at least two of said deformable beams of said at least three beams;

illuminating said light valve;

applying voltage between said first electrode and said second electrode; and wherein said first electrode comprises an array of electrodes, each electrode of said array of electrodes associated with one of said deformable beams, and said second electrode is common to all said deformable beams.

23. A method according to claim 22, wherein said beam of a substantially fixed-position is deformable by electrostatic force.

24. A method according to claim 22, wherein all said at least three beams form said first electrode and wherein said second electrode is common to all said at least three beams.

25. A method according to claim 22, wherein said at least three beams form said first electrode, and said second electrode comprises an array of electrodes, each electrode of said array of electrodes associated with one of said at least three beams.

26. A method according to claim 22, wherein said first electrode comprises an array of electrodes, each electrode of said array of electrodes associated with one of said at least three beams, and said second electrode is common to all said at least three beams.

27. A method for light modulation, comprising the steps of:

providing a deformable grating light valve, said light valve comprising at least three beams, at least the first beam of said at least three beams being of a substantially fixed-position, and said at least three beams being deformable by electrostatic force in a substantially staircase structure, each step of said staircase creating a predefined change in the phase of an impinging light beam wherein said deformable grating light valve additionally comprises a first electrode and a second electrode, said first and second electrodes transmitting electrostatic force to at least two of said deformable beams of said at least three beams;

illuminating said light valve; and applying voltage between said first electrode and said second electrode.

28. A method according to claim 27, wherein all said at least three beams form said first electrode and wherein said second electrode is common to all said at least three beams.

29. A method according to claim 27, wherein said at least three beams form said first electrode and said second electrode comprises an array of electrodes, each electrode of said array of electrodes associated with one of said at least three beam.

30. A method according to claim 27, wherein said first electrode comprises an array of electrodes, each electrode of said array of electrodes associated with one of said at least three beams, and said second electrode is common to all said at least three beams.

* * * * *

UNITED STATES PATENT AND TRADEMARK OFFICE
CERTIFICATE OF CORRECTION

PATENT NO. : 6,618,187 B2
DATED : September 9, 2003
INVENTOR(S) : Pilossof, Nissim It is certified that error appears in the above-identified patent and that said Letters Patent is hereby corrected as shown below:

Column 1,
Line 18, please replace "and/or light beam steeped In…" with -- and/or light beam steering. In --
Line 59, please replace "The bee 25" with -- The beams 25 --

Column 2,
Line 27, please replace "and while King into" with -- and while taking into --
Line 32, please replace "(tinner line)" with -- (thinner line) --
Line 57, please replace "one beam of being" with -- one beam being --

Column 3,
Before line 20 please insert -- In addition, there is also provided in accordance with a further embodiment of the present invention, a method for light modulation, the method including the steps of: --

Column 4,
Line 17, please replace "IS" with -- MEMS --
Line 24, please replace "invention Modulator 100" with -- invention. Modulator 100 --
Line 33, please replace "in accordance wit the wavelet" with -- in accordance with the wavelength --
Line 42, please replace "star case" with -- staircase --
Line 44, please replace "Faker" with -- Further --

Column 5,
Line 4, please replace "n$\theta$4" with -- n=4 --
Line 26, please replace "blazing)" with -- (blazing) --
Line 27, please replace "diffractive f or" with -- diffractive grating for --
Line 40, please replace "grading" with -- grating --

Column 8,
Line 44, please change the last word from "beam;" to -- beams --

UNITED STATES PATENT AND TRADEMARK OFFICE
CERTIFICATE OF CORRECTION

PATENT NO. : 6,618,187 B2
DATED : September 9, 2003
INVENTOR(S) : Pilossof, Nissim It is certified that error appears in the above-identified patent and that said Letters Patent is hereby corrected as shown below:

Column 10,
Line 18, please change the last word from "beam;" to -- beams --

Signed and Sealed this

Seventeenth Day of February, 2004

JON W. DUDAS
*Acting Director of the United States Patent and Trademark Office*